(12) United States Patent
Cho

(10) Patent No.: US 8,325,038 B2
(45) Date of Patent: Dec. 4, 2012

(54) TWISTED FIBER OPTIC SECURITY MESH

(75) Inventor: Lee Suk Cho, Yongin-si (KR)

(73) Assignee: Youn Bae (KR)

( * ) Notice: Subject to any disclaimer, the term of this patent is extended or adjusted under 35 U.S.C. 154(b) by 315 days.

(21) Appl. No.: 12/751,478

(22) Filed: Mar. 31, 2010

(65) Prior Publication Data

US 2011/0241875 A1    Oct. 6, 2011

(51) Int. Cl.
  *G08B 21/00*    (2006.01)
(52) U.S. Cl. .................... 340/540; 340/561; 340/571
(58) Field of Classification Search .................. 340/540, 340/541, 551, 555, 341, 550, 556–557, 815.31, 340/561, 564–567, 571
  See application file for complete search history.

(56) References Cited

U.S. PATENT DOCUMENTS

| | | | |
|---|---|---|---|
| 4,399,430 A * | 8/1983 | Kitchen | 340/550 |
| 6,980,108 B1 | 12/2005 | Gebbia et al. | |
| 7,110,625 B2 * | 9/2006 | Chun | 385/12 |
| 7,123,785 B2 * | 10/2006 | Iffergan | 385/13 |
| 7,177,518 B2 | 2/2007 | Chun | |
| 7,184,907 B2 | 2/2007 | Chun | |
| 7,190,269 B2 | 3/2007 | Yang | |
| 7,245,810 B2 * | 7/2007 | Iffergan | 385/136 |
| 8,130,637 B2 * | 3/2012 | Owens et al. | 370/218 |

* cited by examiner

*Primary Examiner* — Daniel Previl
(74) *Attorney, Agent, or Firm* — Seed IP Law Group PLLC

(57) ABSTRACT

A fiber optic mesh intrusion detection system includes a mesh structure made from twisted fiber optic cable to form a plurality of rhombic openings. For each of the crossings, a fastener is wrapped around the crossed fiber optic cable, serving both to provide the mesh structure and to protect the crossing points from tampering. Embodiments include fasteners having rotationally symmetric, interlocking portions such that when wrapped around the crossed cable the portions engage each other to hold the fastener in place.

3 Claims, 4 Drawing Sheets

TWISTED FIBER OPTIC SECURITY MESH

FIELD

The present invention relates to Fiber Optic mesh, particularly, whose openings are in rhombus shape of Optical cable sensing direct disturbances by intruder such as cutting, strongly bending or pulling.

BACKGROUND

In general, the Fiber Optic mesh is overlaid to the fence along the perimeter of important facilities such as airport, nuclear power plant, gas reservoir, military site and border and sensitive government facility.

Korean Utility Model registration #20-0205490 presents that Fiber Optic mesh of a rhombic openings (simply called 'rhombic Fiber Optic mesh') has advantageous of enhanced perimeter protection by providing scalability by accommodating any fence height requirements while at the same time facilitating repairs after installation compared to rectangular Fiber Optic mesh.

In previous Korean Utility Model registrations #20-0205490 and #20-038258, two neighboring Optical cables at the cross point of a rhombic Fiber Optic mesh are separated about 5 mm apart and mechanically clamped together using a round cross button to form the rhombic mesh.

For the rhombic Fiber Optic mesh, it is required to use an Optical cable of diameter 3 mm as described in Korean Utility Model registration #20-0429342.

As described in Korean Utility Model registration #20-0380258, the cross button is made of bulky round steel of diameter 25 mm×thickness 20 mm to resist breaking by intruder.

The conventional rhombic Fiber Optic mesh has three drawbacks as following;

An intruder can pass through the mesh hole without being sensed after making a big hole by breaking a cross button along the 5 mm gap using commercial tools such as saw, cutter, punch etc.

The conventional rhombic Fiber Optic mesh having many cross buttons appears very obvious and exposed to intruder even at 100 m distance. This is no good for security purpose.

The conventional rhombic Fiber Optic mesh becomes very heavy. The mesh of 3 m×100 m weighs about 200 kg and costs very high in manufacturing, transportation and installation.

SUMMARY

An aspect of an embodiment of the present invention includes a rhombic Fiber Optic mesh for intrusion detection system, particularly, in which the two neighboring Optical cables at the cross points are twisted each other and covered with a fastener wrapping the two.

The present invention twisted rhombic Fiber Optic mesh provides following advantageous effects;

The boundary between the two neighboring Optical cables at the cross points allows no gap and does not define a straight line, instead defining a squared zig-zag boundary. As a result, the mesh enhances security effect by preventing an intruder from opening the cross point to make a big hole.

The fasteners of twisted Fiber Optic Mesh can be made of tiny metal piece. As a result, the mesh of 3 m×100 m weighs about 40 kg and costs very low in manufacturing, transportation and installation and the mesh becomes almost invisible to intruders compared to conventional rhombic Fiber Optic mesh.

DESCRIPTION OF THE DRAWINGS

Other features described herein will be more readily apparent to those skilled in the art when reading the following detailed description in connection with the accompanying drawings, wherein:

FIG. 1b is a view of a detail of the mesh structure of FIG. 1a;

FIG. 2b is a view of a detail of the mesh structure of FIG. 2a;

DETAILED DESCRIPTION

Figure 1A:
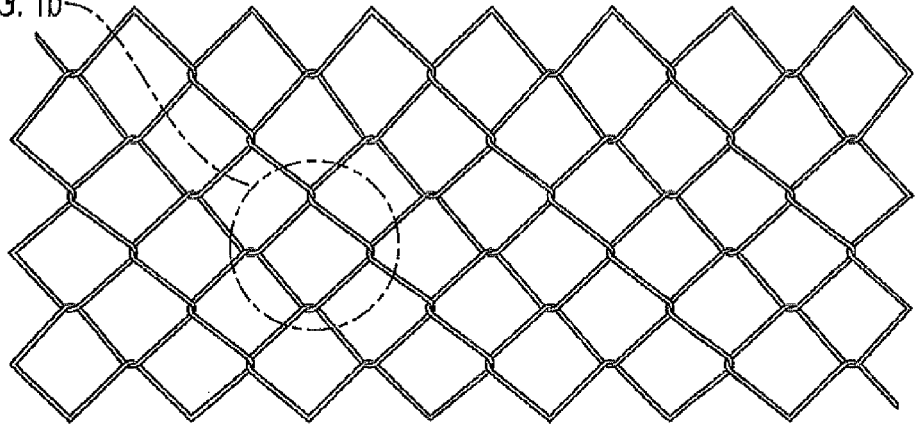
FIG. 1a is a plan view of a mesh structure in accordance with an embodiment of the invention.
Figure 1B:
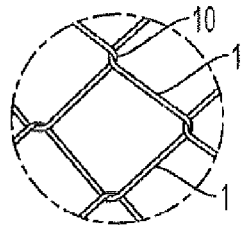

In an embodiment of the present invention, as illustrated in FIG. 1a, optical fiber cable 1 is woven into a mesh structure such that neighboring portions of the cable 1 cross over and are twisted with each other at crossing points 10. The innovative technical aspects and advantages of present invention were already officially recognized by Korean Utility Model registration #20-0443989 under the title 'Mesh Structure of Optical Cable for Trespass Alarming System'.

Figure 2A:
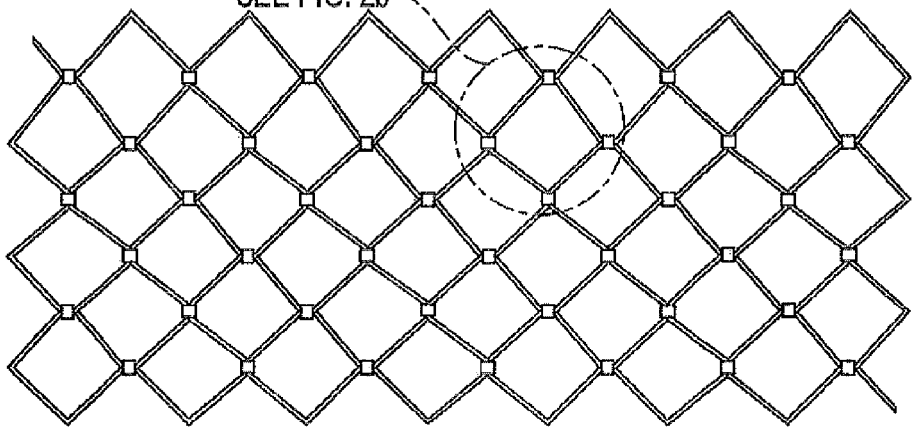
FIG. 2a is a plan view of a mesh structure in accordance with an embodiment of the invention.
Figure 2B:
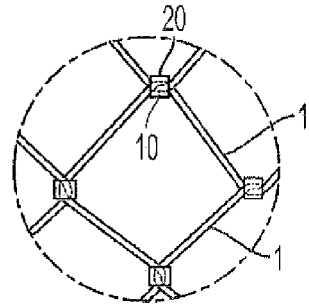

As shown in FIG. 2a, fasteners 20 may be provided at some or each crossing point 10 where the cable 1 crosses over itself. The crossing structure of the cable is configured to form a rhombic array of openings, where corners of each rhombus are wrapped using the fasteners 20.

In an embodiment, the fasteners 20 are made from metal such as stainless steel. By way of example, the fasteners 20 may comprise 18/8 low-carbon stainless steel such as SUS 304.

Figure 3:
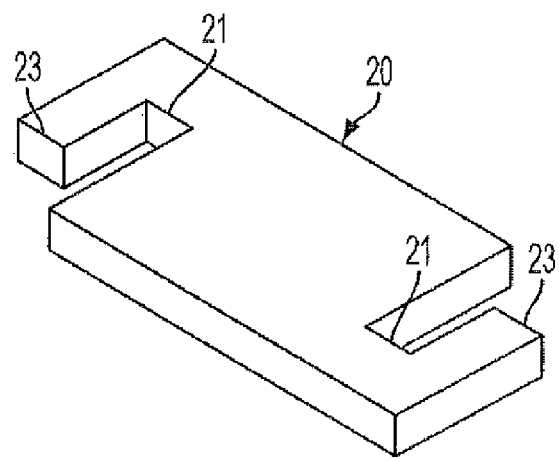
FIG. 3 is a view of an unused fastener in accordance with an embodiment of the present invention.

In an embodiment, the fasteners 20 comprise a flat plate having a slot 21 and tab 23 at each end as shown in FIG. 3. The thickness of the flat plate may be, for example, about 2 mm. In the embodiment of FIG. 3, the fasteners are rotationally symmetric such that the respective slots and tabs have an opposite orientation. In use, the flat plate is wrapped around the cable or cables 1 such that the tab 23 of each end engages the slot 21 of the opposing end to hold the fasteners tightly around the cable 1. Embodiments may include a portion of the tab and/or slot that is designed to act as a detent or otherwise snap fit the two portions together. For example, one or each tab may have a portion that protrudes slightly into the slot to engage a portion of the opposing tab that has a slight depression.

In an embodiment using a 1 mm thick fastener 20, the fastener wrapped around the cable 1 results in a cylinder having a length of about 10 mm and a diameter of about 8 mm.

Figure 4:
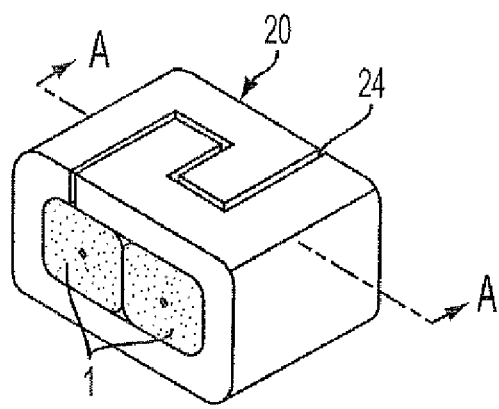
FIG. 4 is an oblique view of the fastener of FIG. 3 in its deployed position.
Figure 5:
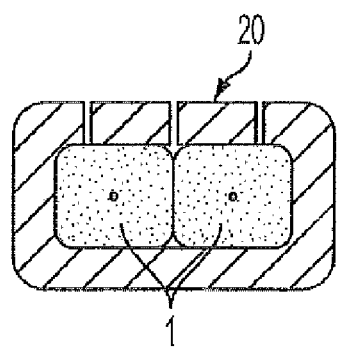
FIG. 5 is a cross sectional view across the line A-A of FIG. 4.

As shown in FIG. 4, when the tab 23 and slot 21 are engaged and the fastener 20 is wrapped around the optical cables 1, the boundary between the slot 21 and tab 23 does not define a straight line, instead defining a squared zig-zag boundary 24. As a result, it may be difficult for an attempted intruder to engage the fastener 20 with a sharp tool in order to remove it. FIG. 5 shows the assembly in cross section.

Figure 6:
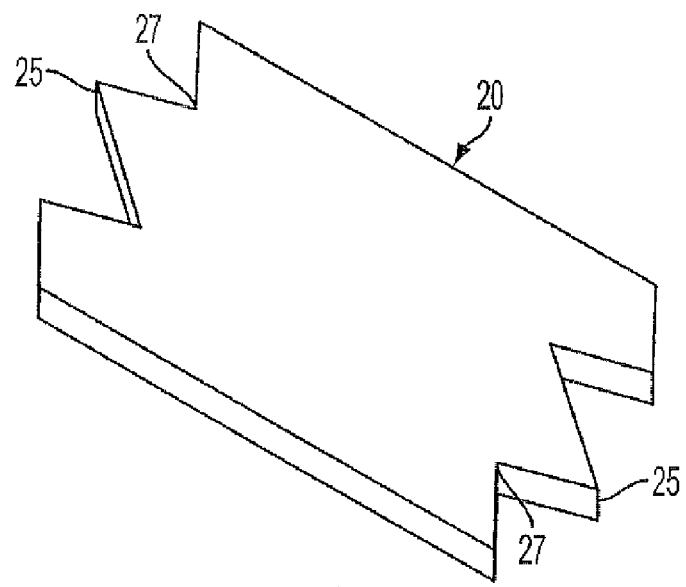
FIG. 6 is a view of an unused fastener in accordance with another embodiment of the present invention.
Figure 7:
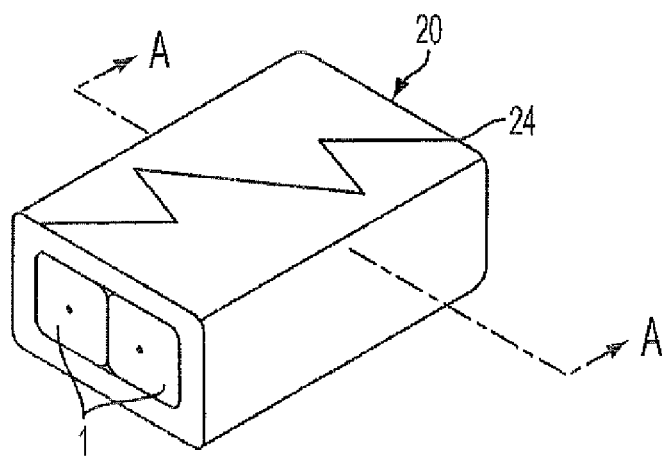
FIG. 7 is an oblique view of the fastener of FIG. 6 in its deployed position.
Figure 8:
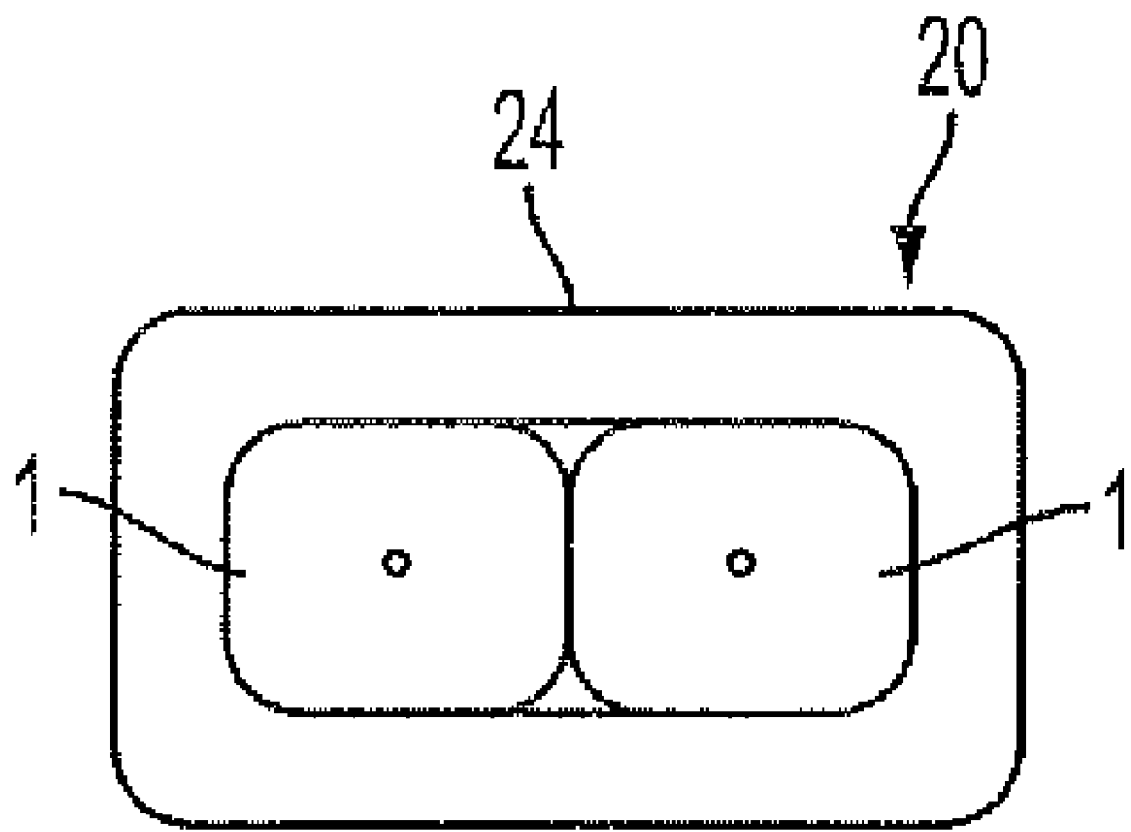
FIG. 8 is a cross sectional view across the line A-A of FIG. 7.

FIG. 6 illustrates another embodiment of the fastener 20. In this embodiment, each end of the fastener includes one or more projections 25 that are configured and arranged to engage respective recesses 27 at the opposite end when the fastener 20 is wrapped around the cable 1. In use, a sawtooth zig-zag boundary 24 is defined by the interlocking ends. As with the previous embodiment, the projections 25 and recesses 27 may include additional interlocking structure such as detents and protrusions. FIG. 7 illustrates the fastener 20 assembled with the cable 1, and FIG. 8 illustrates the assembly in cross section.

Because the crossing points 10 are wrapped inside the fasteners 20, it may likewise be difficult to insert a tool or cutter in order to open the fastener 20. Moreover, because the cables cross each other at each crossing point 10, even if the fastener 20 were to be removed, the mesh structure is configured to remain intact and maintain security of the perimeter.

Those skilled in the art will appreciate that the disclosed embodiments described herein are by way of example only, and that numerous variations will exist. For example, as will be appreciated by one of ordinary skill in the art, the dimensions described herein are by way of example, but are not limits as to sizes that may be used and aspects of various embodiments described may be combined. The invention is limited only by the claims, which encompass the embodiments described herein as well as apparent skilled in the art.

I claim:

1. A fiber optic mesh intrusion detection system, comprising:
    a mesh structure comprising fiber optic cable twisted at a plurality of crossing points to define an array of rhombic openings; and
    a plurality of fasteners, each fastener being wrapped around a respective crossing point of the mesh structure, wherein the fasteners each comprise a single metallic band having interlocking portions at respective ends thereof such that, when wrapped around the respective crossing point, the interlocking portions of the metallic band engage each other to hold the metallic band in place, and wherein the metallic band, prior to wrapping, comprises a flat body.

2. The system of claim 1, wherein, prior to wrapping, the flat body of the metallic band has a slot and a tab at each end, and is rotationally symmetric such that, when wrapped, each tab engages a respective slot from an opposite end of the fastener.

3. The system of claim 1, wherein, prior to wrapping, the flat body of the metallic band has a projection and a recess at each end, and is rotationally symmetric such that, when wrapped, each projection engages a respective recess from an opposite end of the fastener.

* * * * *